United States Patent [19]
Deichmann et al.

[11] Patent Number: 5,952,044
[45] Date of Patent: Sep. 14, 1999

[54] METHOD FOR REDUCING THE LEAD RELEASE OF LEAD CRYSTAL GLASS

[75] Inventors: Karl Joachim Deichmann; Klaus Greiwe, both of Wurzburg; Johanna Kron, Zell; Gerhard Schottner, Heilsbronn, all of Germany

[73] Assignee: Fraunhofer-Gesellschaft zur Forderung der Angewandten Forschung E.V., Germany

[21] Appl. No.: 08/778,359

[22] Filed: Jan. 2, 1997

Related U.S. Application Data

[63] Continuation-in-part of application No. 08/599,418, Jan. 15, 1996, abandoned, and a continuation-in-part of application No. 08/539,270, Oct. 4, 1995, which is a continuation of application No. 08/187,093, Jan. 26, 1994, abandoned.

[30] Foreign Application Priority Data

Jan. 16, 1995 [DE] Germany .............. 195 01 092

[51] Int. Cl.⁶ ...................................... B05D 7/22
[52] U.S. Cl. .................. 427/230; 427/236; 427/240; 427/430.1; 427/385.5; 427/421
[58] Field of Search ................... 427/230, 236, 427/240, 430.1, 385.5, 421

[56] References Cited

U.S. PATENT DOCUMENTS

| | | | |
|---|---|---|---|
| 3,047,417 | 7/1962 | Melrose | 427/230 |
| 5,308,652 | 5/1994 | Cornier | 427/600 |

FOREIGN PATENT DOCUMENTS 4303570  11/1994  Germany .

Primary Examiner—Janyce Bell
Attorney, Agent, or Firm—Barnes & Thornburg

[57] ABSTRACT

The invention relates to a method of reducing lead release from lead crystal glass by applying a coating manufactured by application and hardening of a coating material containing a hydrolytic condensation product comprising a cross-linkable organofunctional hydrosilicon, a metal compound and an organic prepolymer cross-linkable with this hydrolytic condensate.

8 Claims, 1 Drawing Sheet

METHOD FOR REDUCING THE LEAD RELEASE OF LEAD CRYSTAL GLASS

This application is a continuation-in-part of U.S. Ser. No. 08/599,418, filed Jan. 15, 1996 now abandoned and a continuation-in-part of U.S. Ser. No. 08/539,270, filed Oct. 4, 1995 now pending. U.S. Ser. No. 08/539,270 is itself a continuation of U.S. Ser. No. 08/187,093, filed Jan. 26, 1994, now abandoned. U.S. Ser. No. 08/187,093, U.S. Ser. No. 08/539,270 and U.S. Ser. No. 08/599,418 are all assigned to the same assignee as this application.

A high value is assigned to lead crystal glass, particularly due to its brilliant optical properties. The light refractive index ($n_D$) necessary for this high degree of brilliance is achieved above all by high contents of lead oxide. Thus pressed lead crystal glass with an $n_D$>1.520 contains at least 18% of PbO, lead crystal glass with an $n_D$>1.545 at least 24% of PbO and high-lead crystal with an $n_D$>1.545 at least 30% of PbO.

These high PbO contents however are disadvantageous when the lead crystal glass is used in a foodstuffs consumer product. It has become apparent, particularly in the case of various drinks, e.g. juices, wine or spirits, particularly after a long standing period, that lead oxide is dissolved out of the lead crystal carafes or lead crystal glasses. There have been numerous attempts to suppress this lead release. One solution proposes to reduce the dissolution of lead by acid-polishing the glass surface (internal communication, Nachtmann Company). In this way a reduction in lead release can be achieved compared to untreated lead crystal glass surfaces. A further method proposes an ammonium sulphate treatment. Likewise, a reduction in lead release of approximately 10 mg Pb/1 is possible with commercial silicon systems (Acephob coating). Even with these methods however it is not possible to satisfy the requirements, particularly in accordance with the strict environmental protection regulations in the United States (California, Proposition 65), which require a considerably higher reduction in lead release.

Proceeding from this point, the object of the invention is to propose a method of reducing lead release which results in a clearly reduced release of lead compared to prior art.

This purpose is achieved by the characterizing features of claim 1. The sub-claims reveal advantageous further developments.

It is thus proposed according to the invention to provide lead crystal glass which is used as a foodstuffs consumer product with a coating resulting from application and hardening of a coating material containing a hydrolytic condensation product of a cross-linkable organofunctional hydrosilicon, a metal compound and an organic prepolymer cross-linkable with this hydrolytic condensate. Such a coating material, and an associated method for manufacturing the coating material, is known from DE 43 03 570 A1. The method according to the invention may be basically carried out with all the ingredients quoted in this document (cross-linkable organofunctional hydrosilicon, metal compounds, organic prepolymer). Detailed reference is made to the disclosed content of this document. It is however particularly preferred if there are used as an organofunctional hydrosilicon phenyltrimethoxysilane, 3-glycidyloxypropyltrimethoxysilane and/or aminopropyltriethoxysilane. Among the metal compounds, aluminium secondary butylate is preferred, and for the cross-linkable organic prepolymer, epoxy resin is preferred.

It has now become surprisingly apparent that articles made of lead crystal glass, provided with a coating as described above, have clearly reduced lead release compared to prior art. As already described, in previous prior art a maximum lead release of only 10 mg Lead/1 was possible by means of the Acephob coating. Now, with the method according to the invention a fivefold reduction (lead release 0.002 mg Lead/1) may be achieved. This result was surprising to the person skilled in the art, even with knowledge of DE 43 03 570, as DE 43 03 570 described only the manufacture of dishwasher-resistant coatings. From this, the person skilled in the art could derive no special barrier effect against PbO that was superior to this extent. It has become apparent that the coatings applied to articles of lead crystal glass not only have a considerably reduced lead release compared to prior art, but that these coatings in addition reveal an extremely smooth and shining surface and excellent primary adhesion to the surfaces of the lead crystal glass. This also was surprising and unexpected to a person skilled in the art. The layers applied according to the invention to the lead crystal glass surfaces are further characterized by extremely good abrasion resistance and outstanding abrasive hardness. Among other things, this also leads to a situation in which the coatings, even after approximately 100 washes in a washing machine, still extensively retain their barrier effect, compared to which the coating in prior art extensively loses its barrier effect after only 10 to 15 washings.

The coating material may basically be applied by all methods known from prior art. It is preferred if the coating material is applied by spraying. The lead crystal glasses may be internally coated for example by rotary devices with the aid of a spraying lance. Temperatures for hardening the applied coating material depend on the ingredients selected according to DE 43 03 570. Hardening temperatures generally lie within the range of 100 to 250° C.

The invention will now be explained in more detail with reference to examples and detailed test methods.

Thermally curable coating materials for plastic surfaces based on polysiloxane, which lead to improved mechanical characteristics such as scratch resistance and abrasion resistance, have already been used commercially for a considerable time (cf. J. Hennig "Kratzfest beschichtete Kunststoffe" in Kunststoffe 71, 1981, p.103). However, the use of the coating materials described therein is partly limited by the low thermal stability of organic polymeric materials, so that for thermally less stressable thermoplastics, such as e.g. ABS, PS PVC, PUR, PE, PP, etc., UV-curable coating materials have been developed (cf. K. Greiwe in "Better Ceramics through chemistry V" published by M. J. Hampden-Smith, W. G. Klemperer and C. J. Brinker, "Characterisation of hydrolysed Alkoxysilanes and Zirconiumalkoxides for the development of UV-curable scratch-resistant coatings" in Mat. Res. Soc. Symp. Proc. Vol. 271, 1992, p.725). These polysiloxane-based, UV-curable materials are completely suitable for the above-indicated plastics in certain use cases as a result of their faster curing and lower thermal stressing, but fail to completely cover the use range of polysiloxane-based functional protective coatings.

DE 4,025,215 describes an alkali-stable and abrasion-resistant polysiloxane-based coating. The material is obtained by reacting organic epoxides with aminofunctional alkoxy silanes. However, the coating material only has a limited pot life and must therefore be used relatively quickly following its manufacture.

DE 3,828,098 A1 describes a lacquer and a process for the production of scratch-proof coatings. Although this process leads to coatings, which offer satisfactory results with respect to numerous characteristics (e.g. scratch resistance, transparency, good primary adhesion to substrates), improvements are necessary to such coatings for numerous applications.

The main disadvantages of these systems are the lack of permanent adhesion of the thus produced coatings to substrates, as well as an inadequate pot life of the lacquers.

In the case of different corrosive stresses (particularly in alkaline aqueous solutions), the adhesion of such coatings deteriorates down to the complete detachment of the coating and consequently the protection (e.g. abrasion and corrosion protection) for the particular substrate is no longer guaranteed. The lacquers according to DE 3,828,098 A1 have such a short pot life that, if the described good characteristics are to be obtained, must be processed within a few hours (max. 8 h) and must therefore be directly produced in situ.

A coating material and a process for the production of functional coatings on substrates, which compared with the known coating materials, has a permanent adhesion even under unfavorable corrosive conditions, whereby simultaneously good scratch and abrasion resistances are required. In addition, the coating material must have an increased pot life, so that it can be processed over a longer period of time extending to several weeks.

A process for the production of coated substrates is characterized in that in a first stage there is a hydrolytic condensation of an organofunctional, crosslinkable silane of general formula II with the compound of general formula III, optionally in the presence of the organofunctional silane of formula I, and optionally one or more difficulty volatile oxides soluble in the reaction medium. In a second stage, a crosslinkable, organic prepolymer of the corresponding radical R''' is added to said hydrolytic condensate. The resulting coating material is then applied to a substrate and cured in a further stage.

Through the use of the cross-linkable, organic silane of general formula II (component 1) in conjunction with the crosslinkable prepolymer, an additional, organic crosslinking occurs. It has surprisingly been found that the latter crosslinking is responsible for obtaining an excellent permanent adhesion, even when there is simultaneously a corrosive action. At the same time a greatly extended pot life is obtained. It is particularly advantageous if the metal compound of general formula III (component 2) is used in chelated form. This further increases the pot life. As a result of this measure the coating material can be processed for several weeks.

It is advantageous if the viscosity of the coating material is adjusted to a value of 5 to 50 mPa.s. The organofunctional silane of general formula II is crosslinked by an additional organic crosslinking with the aid of a purely organically crosslinkable prepolymer. Both the radical R''' and the corresponding substituent of the organofunctional silane of general formula II are responsible for said crosslinking. Therefore the crosslinking can start from the radical R''' or the substituent of the radical R'''. However, preferably the crosslinking starts from the substituent.

The groups X in the general formulas I and II, which can be the same or different, can be hydrogen, halogen, alkoxy, acyloxy, alkylcarbonyl, alkoxycarbonyl or $NR''_2$, in which R'' is hydrogen or alkyl.

The non-crosslinkable radicals R', which can be the same or different, are either alkyl, aryl, arylalkyl or alkylaryl. These radicals can be interrupted by O or S-atoms or the NR'' group and carry one or more non-crosslinkable substituents from the group of halogens and the optionally substituted amide, aldehyde, keto, alkylcarbonyl, carboxy, cyano, alkoxy or alkoxycarbonyl groups. Alkyl radicals are e.g. straight-chain, branched or cyclic radicals with 1 to 20 preferably 1 to 10 carbon atoms and in particular lower alkyl radicals with 1 to 6 and preferably 1 to 4 carbon atoms. Specific examples are methyl, ethyl, n-propyl, isopropyl, n-butyl, sec.-butyl, tert.-butyl, isobutyl, n-pentyl, n-hexyl, dodecyl, octadecyl and cyclohexyl.

Preferably, in the silanes or general formula I, the index m=1. In the case of higher values of m, there is a risk of a reduction in the hardness of the material, if too much such silane is used.

Specific examples for the organofunctional silanes of formula I are: bis-(dimethylamino)-methyl phenyl silanes, bis-(mono-n-butyl-amino)-dimethyl silanes, 2-chloroethyl trichloro silanes, 2-chloroethyl methyl dichloro silanes, di-n-butyl dichloro silanes, diethyl diethoxy silanes, ethyl trimethoxy silanes, 8-bromoctyl trichloro silanes, 3-bromopropyl trichloro silanes, t-butyl-trichloro silanes, 1-chloroethyl trichloro silanes, chloromethyl trichloro silanes, chlorophenyl trichloro silanes, cyclohexyl trichloro silanes, dimethyl dichloro silanes, diphenyl dichloro silanes, ethyl dichloro silanes. Particular preference is given to phenyl trimethoxy silane, aminopropyl triethoxy silane and propyl trimethoxy silane. All the silanes are commercially obtainable, e.g. from ABCR GmbH & Co., Postfach 210135, D-7500, Karlsruhe 21.

In the organofunctional silanes of general formula II (component 1), X and m have the meanings given hereinbefore. The radical R''' or the substituent must be such that it is suitable for crosslinking. The radical R''' can be: alkyl, alkenyl, alkinyl, aryl, arylalkyl, alkylaryl, alkylalkenyl, alkenylaryl, arylalkinyl or alkinylaryl. These radicals can be interrupted, as in the case of the organofunctional silane of general formula I, by O or S-atoms or the NR'' group. The radical R''' can also carry one or more crosslinkable substituents from the group of halogens and the optionally substituted amino, amide, aldehyde, keto, alkylcarbonyl, carboxy, mercapto, cyano, hydroxy, alkoxy, alkoxycarbonyl, sulphonic acid, phosphoric acid, acryloxy, methacryloxy, epoxy or vinyl groups.

Specific examples for crosslinkable, organofunctional silane of general formula II are vinyl trimethoxy silane, aminopropyl triethoxysilane, isocyanatopropyl triethoxy silane, mercaptopropyl trimethoxy silane, vinytriethoxy silanes, vinyl ethyl dichloro silanes, vinyl methyl diacetoxy silanes, viny methyl dichloro silanes, vinyl methyl diethoxy silanes, vinyl triacetoxy silanes, vinyl trichloro silanes, phenyl vinyl diethoxy silanes, phenyl allyl dichloro silanes, 3-isocyanotopropyl triethoxy silanes, methacryloxy propenyl trimethoxy silanes and 3-methacryloxy propyl trimethoxy silanes. Particular preference is given to methacryloxy propyl trimethoxy silane and 3-glycidyloxy propyl trimethoxy silane. These and further silanes can be obtained from the same manufacturer as indicated hereinbefore.

Metal compounds usable according to the invention are in particular those with the empirical formula $MeR_y$ (III), in which the radicals R, which can be the same or different, stand for halogen, alkyl, alkoxy, acryloxy or hydroxy. Examples of preferred metals are Al, Ti or Zr and y is then either 3 for Al or 4. Particular preference is given to Al. Preferably the metal compounds of general formula (III), before undergoing hydrolytic condensation, are chelated with a standard chelating ligand in the ratio 1:0.5–2. A ratio of approximately 1:1 has proved advantageous. The chelating ligand can be any standard chelating ligand, particularly acetyl acetone or ethyl acetoacetate.

Specific examples for usable metal compounds are e.g. disclosed in DE 3,828,098 and DE 3,407,087, which are then chelated with the corresponding chelating ligands.

In place of the monomeric starting silanes, it is optionally possible to also use precondensed oligomers of said silanes, which are soluble in the reaction medium, i.e. straight-chain or cyclic, low molecular weight partial condensates (polyorganosiloxanes) with a degree of condensation of e.g. approximately 2 to 100, particularly approximately 2 to 6. The same applies with respect to the metal component (III). It is also possible to use fluorinated silanes, as described in EP 358,011 A2.

As the fourth component, the reaction medium can optionally contain soluble, difficulty volatile oxides or, compounds forming such difficulty volatile oxides of elements of the main group Ia to Va or their auxiliary groups IIb, IIIb, Vb to VIIIb of the periodic system of elements, with the exception of aluminium. Among the difficulty volatile oxides particular preference is given to $B_2O_3$, $P_2O_5$ and $SnO_2$.

For crosslinking purposes, use is made of prepolymers in which the reacting, crosslinkable groups of the radical R''' and/or the crosslinkable substituents at the radical R''' can be crosslinked with the reacting groups at the prepolymer and these preferably include "like" prepolymers. The term like, crosslinkable prepolymers is understood to mean those in which the reacting groups are identical. In the case of epoxy group-containing silanes, use is made of epoxy resin, while in the case of acrylic group-containing silanes use is made of acrylates and generally acrylates are used in the case of acryloxy group-containing radicals. In the case of vinyl radicals or radicals with other polymerizable double bonds, prepolymers with crosslinkable double bonds are used.

The following crosslinking possibilities are also contemplated: mercapto group-containing silanes and prepolymers with crosslinkable double bonds, isocyanate group-containing silanes and polyols, hydroxy group-containing silanes and isocyanates, amino group-containing silanes and epoxy resins.

In part, mixtures of epoxy group-containing silanes and epoxy resins also contain silanes with aminoalkyl radicals. Here the amino group can crosslink both with the epoxy unit at the silane and with the epoxy resin.

For producing the coating, the organofunctional silanes of general formula II and optionally I are stirred under ice cooling. Following this the metal compound of general formula III is chelated or a chelating ligand is added and then hydrolytic condensation takes place. A prepolymer crosslinkable with the radical R''' is then added to the reaction mixture. Preferably the viscosity of the mixture is set to the desired value using conventional lacquer solvents. The mixture thus obtained is then applied to a substrate and cured.

For the production of the coating, it is preferable to use 10 to 95, particularly 20 to 90 and with particular preference 30 to 90 mole % of component 1, 5 to 75, particularly 5 to 60 and in particularly preferred manner 10 to 40 mole % of component 2 and 0 to 60, particularly 0 to 50 and in particularly preferred manner 0 to 40 mole % of component 3 and max. 0 to 70 and preferably max. 0 to 40 mole % of component 4.

Component 1 is the crosslinkable silane of general formula II, component 2 the metal compound of formula III and component 3 the non-crosslinkable silane of general formula I.

It is particularly advantageous if hydrolytic condensation is performed in such a way that there is a hydrolytic precondensation with a lower water quantity than the quantity stoichiometrically required for complete hydrolysis of the hydrolyzable groups and then the prepolymer is added and subsequently further condensation takes place by adding further water, which partly or wholly brings about the hydrolysis of the remaining hydrolyzable groups.

Preferably, precondensation takes place in the presence of a condensation catalyst, which includes all condensation catalysts of DE-OS 3,828,098.

The processing of the coating material can now take place either immediately or only after a few weeks. As a result of the preferred use of the chelated metal compound, it is possible to keep the coating material processable over a period of several weeks. Coating can then take place using all prior art processes, such as dipping, flow coating, pouring, centrifuging, spraying, rolling or brushing on. The substrates for the coating can be random materials such as e.g. metals, plastics, ceramics, glass, paper or wood. The coating can be applied in different layers of e.g. 1 to 100 or preferably 2 to 30 µm. It is preferable for the hardened coating to be subsequently treated chemically and/or physically, preferably with laser (UV) radiation.

Substrates are coated using the above-described process. A coating material produces coatings on substrates. A hydrolytic condensate is produced from the above-described organofunctional silanes. An organic, crosslinkable prepolymer of the corresponding radical R''' is then added to said hydrolytic condensate in a second stage. As in the process, it is again preferable for the hydrolytic condensation to be performed first as a hydrolytic precondensation of components 1 to 4 with a smaller water quantity than that necessary for complete hydrolysis, followed by the addition of the prepolymer and further condensation.

The coating material can contain conventional additives and condensation catalysts. With regards to the conventional additives it is preferable to use organic thinners, flow-control agents, coloring agents, UV-stabilizers, fillers, viscosity regulators, lubricants, spreading agents, sedimentation inhibitors, oxidation inhibitors or mixtures of these substances. Preferably, precondensation takes place in the presence of a condensation catalyst. The condensation catalyst, including the condensation catalysts disclosed in DE-OS 3,828,098, can be in the form of amines and compounds splitting off hydroxyl ions or protons. It is advantageous to set the viscosity at 0 to 50 and in particular to approximately 15 mPa.s.

With the coating material or with the process for producing coated substrates, coatings on substrates are obtained which, besides high scratch and abrasion resistance and excellent adhesion to different substrates (particularly glass and different metals) are in particular characterized by permanent adhesion (following various weather resistance tests) and good stability with respect to alkaline solutions. The characteristics of the coated material are maintained, even if it is only applied after a certain storage time (several weeks). As the viscosity of the coating material only rises very slowly (from approximately 12 to approximately 17 mPa.s after storing for 6 weeks), even after 6 weeks storage, it is possible to obtain coatings having excellent characteristics.

In addition, the coating material can be very adequately colored using known dyes and can be processed to screen printable pastes by adding aerosols and optionally paint pigments (as a function of requirements).

Dyes soluble in alcoholic-aqueous solutions are particularly preferred. Such dyes are e.g. commercially available from Ciba-Geigy under the name Orasol dyes.

Preferably the coating material is also suitable for the application of a barrier layer with respect to $H_2S$.

The invention may best be understood by referring to the following detailed description and accompanying single drawing FIG. 1 which illustrates an abrasion resistance test apparatus useful for evaluating film abrasion resistance. The following examples serve to illustrate the coating and process.

EXAMPLE 1

59.5 g of phenyl trimethoxy silane, 460.1 g of glycidyloxy propyl trimethoxy silane and 26.9 g of aminopropyl triethoxy silane are brought together and stirred under ice cooling. 147.8 g of aluminium sec. butylate are mixed with 78.1 g of ethyl acetoacetate and slowly added to the reaction solution. Accompanied by stirring and while maintaining ice cooling, 182.3 g of water are carefully and slowly added. At the end of hydrolysis, 88.6 g of epoxy resin D.E.R. 330 (Dow Corning Company) are stirred into the hydrolyzate.

For adjusting the lacquer characteristics, it is possible to add at this time conventional lacquer additives and solvents (high boiling alcohols and glycol ethers).

The reaction solution can also be applied by conventional processes to different substrates. If the coating material is applied to cleaned brass fittings by spraying, then after curing (2 hours at 160° C.) colorless, transparent coatings are obtained, which are characterized by good adhesion and abrasion resistance characteristics.

Results:

a) after 130 hours salt-spray test (DIN 50 021): no corrosion damage on the surface, b) after 3 cycles of the $SO_2$ test (Kesternich test): individual corrosion spots on the surface, which are more pronounced in the vicinity of the grid, c) after 200 hours condensing humidity test (DIN 50 017): Gt 0, d) after 24 hours hand sweat dewing (based on ISO 4538-1978 (E)): individual, but very few corrosion spots on the surface.

For testing the barrier action with respect to $H_2O$ in connection with this coating material, a tarnishing test for silver-plated articles was also performed.

Tarnishing Test for Silver-Plated Articles

Gassing in the "tarnishing box", volume of box: 380 l (55×80×90 cm) with air circulation by fan.

Performance of the tarnishing test: placing a 2 liter beaker with 0.2 ml of ammonium polysulphide solution in 2 liters of deionized water on the bottom of the tarnishing box.

Evaluation of the tarnishing behavior: 1 hour—several days, compared with clean silver surfaces.

Compared with the coatings produced in DE 3,828,098, the results obtained with the coating material according to the invention are clearly superior, both with regards to hand sweat dewing and the pot life. The good barrier action against $H_2S$ must also be stressed.

Testing Methods Used

The coatings were evaluated with the following testing methods for their hardness, abrasion resistance, adhesion and storage stability under moist climatic conditions:

DETERMINATION OF THE ABRASION RESISTANCE (DIN 52347)

Figure 1:
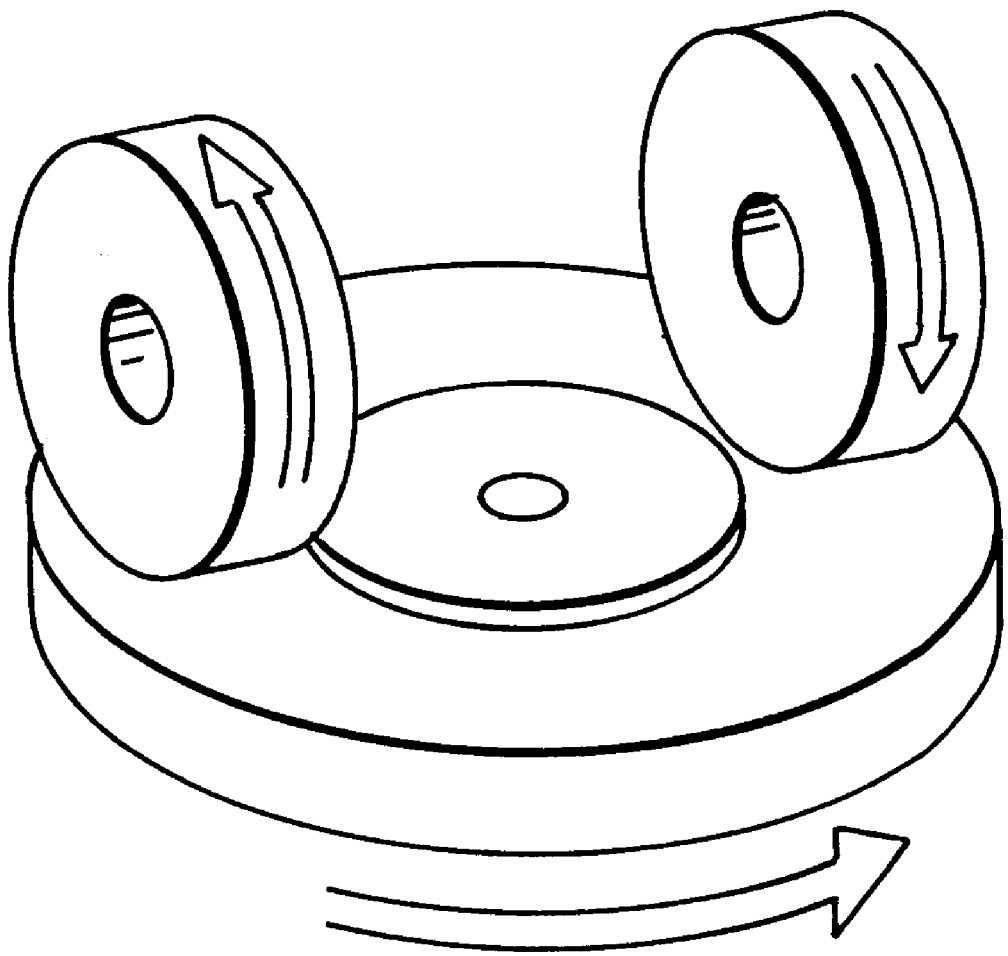
FIG. 1 illustrates friction wheels testing the abrasion resistance of the coated substrate.

This abrasion test using the friction wheel method was carried out to test the behavior of glass and transparent plastic with respect to sliding abrasion. The test was performed on planar surfaces. The increase in the scattered light was the test quantity. The testpiece, lying on the turntable of the abrasion testing apparatus, was subject to sliding abrasion by the action of two friction wheels rotating in opposite directions (100 cycles). See FIG. 1. The friction wheels were made from a clearly defined, fine-grain abrasive ($Al_2O_3$) embedded in rubber. The measurement quantity for the abrasion was the increase in the scattering of the transmitted light, resulting from the surface change during the abrasion test. It is to be measured as the degree of scattered transmission $t_d$ or as turbidity $T_d$.

Evaluating the Adhesion to the Substrate

The adhesion of coatings to the substrate was tested according to three different methods:

a) Tesa film abrasion test for testing the marginal adhesion. A strip of a commercially available Tesa film (Tesafix 6996) was applied to the edge of the CD at an undamaged point of the lacquer film, firmly pressed in air bubble-free manner and then tugged off under an angle of 90°. Both the tesa strip and also the thus treated lacquer surface were tested for the presence of tugged off coating material. The test can be repeated for a random number of times (up to 20) using new Tesa film at the same point of the coated substrate.

b) Grid test (DIN 53151)—The grid test is a simple empirical test for evaluating the adhesion of lacquers to the substrate. It is also possible to evaluate the brittleness and other strength characteristics of the lacquer. This is carried out by means of a multiple cutter which makes a cut pattern with 6 cuts passing through to the substrate, which leads to a grid having 25 squares. By examining the squares under a microscope and comparing them with reference images, grid characteristics from Gt 0 (very good adhesion) to Gt 5 (very poor adhesion) are obtained.

c) Tape Test (ASTM D 3359)—This test corresponds to DIN 53151. For evaluating the cut pattern, use is made of a strip of commercially available Tesa film which is applied to the cut point and rapidly pulled off under an angle of 90°. The subsequent evaluation takes place according to the aforementioned principle.

Condensing Humidity Test (DIN 50017)

The coated testpiece was stored for 14 days in a heating cabinet at 40° C. and with high atmospheric humidity. The adhesion was then evaluated and the scratch hardness determined. If the values found are in the same range (the grid characteristics must decrease by at the most one unit), the test is considered to have been successfully completed.

EXAMPLE 2

5.9 g of phenyl trimethoxy silane, 48.4 g of glycidyloxypropyl trimethoxy silane and 2.7 g of aminopropyl triethoxy silane are brought together and stirred under ice cooling. 14.8 g of aluminium sec. butylate are mixed with 7.8 g of ethyl acetoacetate and slowly added to the reaction solution. 18.2 g of water are carefully and slowly added, accompanied by stirring and maintaining ice cooling. At the end of hydrolysis, 9.68 g of epoxy resin D.E.R. 330 (Dow Corning Company) are stirred into the hydrolyzate.

It is possible to add conventional lacquer additives and solvents (high boiling alcohols and glycol ethers) at this time for adjusting the lacquer characteristics.

The reaction solution can then be applied by conventional processes to different substrates. If the coating material is applied by the dipping process to silver plates cleaned in the ultrasonic bath (ethanol and isopropanol as solvents), after curing (2 hours at 160° C.) colorless, transparent coatings are obtained, which have a good adhesion and abrasion resistance and a good barrier action relative to $H_2S$.

EXAMPLE 3

17.8 g of phenyl trimethoxy silane, 138.3 g of 3-glycidyloxy propyl trimethoxy silane and 9.9 g of aminopropyl triethoxy silane are stirred under ice cooling. 44.33 g of aluminium sec. butylate are mixed with 23.4 g of ethyl acetoacetate and added to the reaction mixture. After adding 3 g and then 6 g of water, stirring in each case takes place for 15 min, accompanied by ice cooling. After a further addition of 48.6 g of water, stirring takes place for a further 2 h at ambient temperature.

26.79 g of epoxy resin and 0.54 g of a flow-control agent are now added to the mixture. The viscosity of the mixture is adjusted to approximately 10 mpa.s by conventional lacquer solvents.

Comparable coating results are obtained with the coating materials given in Table 1.

EXAMPLE 4

23.80 g of phenyl trimethoxy silane, 37.25 g of methacryloxypropyl trimethoxy silane and 7.39 g of aluminium sec. butylate are mixed together in a three-necked flask, accompanied by ice cooling. This is followed by the dropwise addition of 19.23 g of distilled water, which initially takes place very slowly (⅓ of the quantity within 15 min.) and then somewhat faster (remainder in approximately 5 min.). After stirring for 2 h at ambient temperature, 0.16 g of a flow-control agent, 14.61 g of ethyl acetoacetate, 4 g of tetraacrylate and 2.8 g of a photoinitiator are successively added. This gives a clear, low viscosity solution. It is applied by a dipping process to a glass plate and is photochemically cured with thermal after-treatment (either 45 min./130° C. or by means of IR-radiation).

Coatings produced in this way are colorless, clear and highly transparent. They are characterized by high wiping and abrasion resistance, good chemical stability and a permanently good adhesion to the substrate, even after different weather exposure tests.

TABLE 1

| Composition | Example 5 | Example 6 | Example 7 | Example 8 |
|---|---|---|---|---|
| Phenyl trimethoxy silane | 35.7 g | 11.9 g | — | — |
| Propyl trimethoxy silane | — | — | 28.6 g | 28.6 g |
| 3-glycidyloxy-propyl trimethoxy silane | 297.8 g | 99.3 g | 127.5 g | 127.5 g |
| Aminopropyl triethoxy silane | — | — | 9.9 g | 9.9 g |
| Al(OBu$^s$)$_3$ | 88.7 g | 29.6 g | 33.3 g | 33.3 g |
| Complexing | 46.85 g$_{(1)}$ | 15.6 g$_{(1)}$ | 23.4 g$_{(1)}$ | 23.4 g$_{(1)}$ |
| Water | 6 g/12 g/ 97 g | 2 g/4 g/ 32 g | 3 g/6 g/ 49 g | 3 g/6 g/ 49 g |
| Epoxy resin | 53.7 g$_{(3)}$ | 35.8 g$_{(3)}$ | 25.8 g$_{(4)}$ | 51.6 g$_{(4)}$ |
| Flow-control agent | 1.1 g | 0.4 g | 0.5 g | 0.5 g |
| Composition | Example 9 | Example 10 | Example 11 | Example 12 |
| Phenyl trimethoxy silane | 17.8 g | 53.5 g | 53.5 g | 5.9 g |
| Propyl trimethoxy silane | — | — | — | — |
| 3-glycidyloxy-propyl trimethoxy silane | 149.9 g | 95.7 g | 95.7 g | 46.1 g |
| Aminopropyl triethoxy silane | — | 9.9 g | — | 3.3 g |
| Al(OBu$^s$)$_3$ | 44.3 g | 44.3 g | 44.3 g | 14.8 g |
| Complexing | 18.0 g$_{(2)}$ | 23.4 g$_{(1)}$ | 23.4 g$_{(1)}$ | 7.8 g$_{(1)}$ |
| Water | 3 g/6 g/ 49 g | 3 g/6 g/ 49 g | 3 g/6 g/ 49 g | 1 g/2 g/ 16 g |
| Epoxy resin | 26.9 g$_{(3)}$ | 26 g$_{(3)}$ | 25 g$_{(3)}$ | 8.9 g$_{(5)}$ |
| Flow-control agent | 0.6 g | 0.6 g | 0.5 g | 0.2 g |
| Composition | Example 13 | Example 14 | Example 15 | Example 16 |
| Phenyl trimethoxy silane | 8.9 g | 26.8 g | 53.5 g | — |
| Propyl trimethoxy silane | — | — | — | — |
| 3-glycidyloxy-propyl trimethoxy silane | 72.4 g | 50.3 g | 100.6 g | 170.1 g |
| Aminopropyl triethoxy silane | 3.3 g | 5.0 g | 10.0 g | — |
| Al(OBu$^s$)$_3$ | 22.2 g | 22.2 g | 44.3 g | 44.3 g |
| Complexing | 11.7 g$_{(1)}$ | 11.7 g$_{(1)}$ | 23.4 g$_{(1)}$ | 23.4 g$_{(1)}$ |
| Water | 1.5 g/3 g/ 24 g | 1.5 g/3 g/ 24 g | 3 g/6 g/ 49 g | 3 g/6 g/ 49 g |
| Epoxy resin | 13.6 g$_{(6)}$ | 14.5 g$_{(6)}$ | 28.9 g$_{(4)}$ | 21.4 g$_{(3)}$ |
| Flow-control agent | 0.3 g | 0.3 g | 0.6 g | 0.6 g |

1) Ethyl acetoacetate
2) Acetyl acetonate
3) D.E.R. 330
4) Araldyt GY 260
5) Lekuterm 18 X
6) D.E.R. 331

EXAMPLE 17

17.8 g of phenyltrimethoxysilane, 138.3 g of 3-glycidyloxypropyltrimethoxysilane and 9.9 g aminopropyltriethoxysilane were mixed together in a 3-necked bottle under ice cooling. 44.33 g of aluminium secondary butylate are mixed with 23.4 g aceto-acetic ester and allowed to mix reactively. After the addition of 3 g and then 6 g of distilled water, stirring is carried out respectively for 15 minutes with ice cooling. Then 48.6 g of water is again added and stirring is continued for 2 hours at ambient temperature.

26.79 g epoxy resin and 0.54 g of a levelling agent are now added to the mixture. The viscosity of the mixture is set at approximately 10 m Pas by conventional lacquer thinners.

The coating material thus obtained may be extremely easily applied by spraying. Inner coating was effected in a rotary device with the aid of a spraying lance (nozzle 0.5 mm on the directional jet, spraying angle 45°).

The coating thus applied had a coating thickness of 10 μm and was hardened at 160° C.

The coatings were assessed by the following test methods for their adhesion, hardness, abrasion resistance, dishwasher resistance and for their resistance to UV stress:

Assessment of Adhesion to the Substrate

Adhesive strengths of the coatings on their base was tested by two different methods:

a) Tesafilm tear-off test

A strip of a commercially available tesafilm (Baiersdorf AG, Hamburg) is applied to an undamaged point of the lacquer film pressed tight to remove bubbles and then pulled off backwards at an angle of 90°. Both the Tesafilm and the latter surface so treated are tested for the presence or removal of any coating material. This method permits any obvious defects in adhesion to be detected.

b) Tape Test (ASTM D 3359)

The Tape Test is a simple empirical test to assess the adhesion of paints to the substrate. Furthermore, brittleness and other strength properties of the paint may be assessed. For this purpose by means of a multi-blade apparatus (cut width=5 mm, blade spacing=1 mm) a cut pattern continuous as far as the substrate is drawn with 6 cuts, so that a grid with 25 squares results. Then a strip of a commercially available Tesafilm is applied to the cut point and rapidly drawn off at an angle of 90°. By means of microscopic observation of the squares and their comparison with reference images, tape test characteristic values of B 5 to B 0 are obtained.

| Tape Test Characteristic Values | Description |
| --- | --- |
| B 5 | The cut edges are totally smooth, and no particle of the paint is chipped off. |
| B 4 | No splinters of paint are chipped off at the intersection points of the grid lines; chipped off surface approximately 5% of the particles. |
| B 3 | The paint is chipped off along the cut edges and/or at the intersection points of the grid lines; chipped off surface approximately 15% of the particles. |
| B 2 | The paint is chipped off along the cut edges in part or in whole in wide strips and/or the paint is totally or partly chipped off from individual particles; chipped off surface approximately 35% of the particles. |
| B 1 | The paint is chipped off entirely or partly along the cut edges in broad strips and/or partly or completely from individual particles; chipped off surface approximately 65% of the particles. |
| B 0 | Chipped off surface more than 65% of the particles. |

DETERMINATION OF MICRO-ABRASIVE HARDNESS

Surface hardness was tested with a modified micro hardness test apparatus of the company E. Leitz Wetzlar GmbH. A Vickers diamond is slowly lowered onto the surface via a small load table, which is loaded with a specific weight, and then the sample table is drawn away at a constant speed beneath the diamond point. After microscopic observation, the loading weight is indicated at which a visible scratch trace just becomes available.

DETERMINATION OF ABRASION RESISTANCE (DIN 52347)

This wear test according to the friction wheel method serves to test the behavior of glass, transparent plastics and coating systems in the presence of sliding wear. The test is carried out on flat surfaces. The increase in diffused light serves as a criterion. The sample is subjected to sliding wear, lying on the rotary plate of a wear test apparatus (Teledyne Taber Abraser, Model 503; Company Erichsen), by two friction wheels (Type cS 10 F; company Teledyne Taber) which are rotating in opposed directions. See FIG. 1. The friction wheels comprise a specific fine-grained grinding medium ($Al_2O_3$), embedded in rubber. The loading weight was 500 g. The number of rotations of the rotary plate is given in the respective Tables 2 and 3.

The increase in diffused light of the transmitted light, constrained by the surface changes during the wear test, is used as a criterion for wear. It is to be measured as a degree of the diffused transmission $t_d$ or as opaqueness $T_d$. A Hazegard system XL-211 of the company Pacific Scientific is used as a device for measuring diffused light.

d) Evaluation of dishwasher resistance

A domestic dishwasher of the Miele Company (Type: Dishwasher G 570) and a test dishwasher (company Miele, Type: Special machine G 540 Special) were available for assessment of dishwasher resistance. The washing program Universal 65° C. of G 570 corresponds to Program 3 of G 540 Special: pre-rinsing, cleaning (65° C.), intermediate rinsing, clear rinsing (65° C.), drying. The washing additives used are commercially available cleaners (e.g. clear rinser e.g. Somat). A plurality of washing cycles can take place automatically in the test dishwasher. The cleaner is added from a supply container with a metering device. After each washing cycle the door opens automatically, there follows a 30-minute standstill phase, and thereafter the door closes and the machine starts again. The washing cycles for the coated goblet bases are given in Table 3. The coated goblet bases are assessed according to this test in terms of optical quality (alteration in the optical properties, e.g. opacity, scratch formation or dissolution of the coating) and adhesive strength in the Tesafilm tear-off test.

DETERMINATION OF LEAD RELEASE

Determination of lead release in terms of DIN 51031 was done by means of conventional analytical methods.

The sprayed-on and temperature-treated coatings are absolutely colorless, highly transparent, have a very smooth and shining surface and reveal good primary adhesion (Tape Test B 5 to 4) on the lead crystal glass surfaces. The coating system reveals excellent abrasion resistance (1% increase in opacity after 100 abrasion cycles) and high values in the determination of scratch hardness (7 g).

Table 2 shows the comparison of lead release of a lead crystal bowl coated according to the invention with untreated acid-polished, ammonium sulphate-treated glass bowls coated with Acephob (commercially available system of the company Aachener Chemische Werke). Thereafter the release of lead can be reduced approximately five-fold by acid polishing the glass surface. Similar results (50 to 60 ppb) are achieved by the ammonium sulphate treatment. A further improvement in the barrier effect for lead ions (approximately 10 ppb) is possible with the commercial silicone systems. The glasses coated according to the invention, on the other hand, reveal a degree of lead release which is reduced by almost a factor of 5. In this case the lead release is at the threshold of detection at 2 to 3 ppb.

TABLE 2

Determination of lead release according to DIN 51 031 of lead crystal bowls with different treatments

| Treatment method | Volume brimfull | Extraction Volume | Lead Release |
|---|---|---|---|
| Goblet 1 | 160 ml | 155 ml | 0.240 mg Pb/l |
| Goblet 2 | 160 ml | 155 ml | 0.250 mg Pb/l |
| Acid Polishing | | | |
| Bowl 01 | 420 ml | 360 ml | 0.047 mg Pb/l |
| Bowl 2 | 420 ml | 360 ml | 0.047 mg Pb/l |
| Bowl 3 | 420 ml | 360 ml | 0.052 mg Pb/l |
| Ammonium-Sulphate Treatment | | | |
| Bowl 51 | 430 ml | 370 ml | 0.061 mg Pb/l |
| Bowl 2 | 430 ml | 370 ml | 0.057 mg Pb/l |
| Bowl 3 | 430 ml | 370 ml | 0.059 mg Pb/l |
| Acephob-Coating | | | |
| Bowl 01 | 440 ml | 380 ml | 0.012 mg Pb/l |
| Bowl 2 | 440 ml | 380 ml | 0.010 mg Pb/l |
| Bowl 3 | 440 ml | 380 ml | 0.010 mg Pb/l |
| Coating According to the Invention | | | |
| Bowl 51 | 430 ml | 370 ml | 0.002 mg Pb/l |
| Bowl 2 | 430 ml | 370 ml | 0.002 mg Pb/l |
| Bowl 3 | 430 ml | 370 ml | 0.003 mg Pb/l |

Table 3 shows the diffusion barrier effect before and after bleaching in the dishwasher for untreated lead crystal glasses, and such glasses coated according to the invention. Up to approximately 50 washes, the excellent barrier properties of the coatings according to the invention remain constant. After washing for approximately 100 times, the coatings tested still have a considerable barrier effect at 10 to 20 ppb. Acid-polished and silicon-coated lead crystal glass substrates, after 25 washing machine cycles, again reach the lead release values of untreated glasses, glasses treated with ammonium sulphate after approximately 50 washes (not quoted in the Tables).

into contact under test conditions with aqueous and non-aqueous solvents, which are suitable for simulating the influence of foodstuffs.

The dry residues of the migrated materials represent the amounts of migrating in all from the surface. According to the instructions of the Plastics Commission, the organic components of the dry residues were determined as chloroform-soluble components. The qualitative and quantitative testing of the migrates for organically bound nitrogen, phenol, formaldehyde, primary aromatic amines and heavy metals was effected in accordance with the requirements of recommendation XL of the Plastics Commission of the Federal Health Authority. Sensory testing was carried out with respect to DIN 10959. A plurality of trained test personnel assessed, independently of one another in a triangular test, particularly taste-sensitive test solutions, which had been in contact with the coatings in a ratio of 1 $cm^2$ surface area to 2 ml and 2 $cm^2$ surface area to 1 ml test solution under various time-temperature conditions, in comparison to solutions which have not been in contact with the test subjects.

The test results are assembled in Table 4. The dry residues of the migrates, both as regards the overall residues and also as regards the chloroform-soluble components, were low and below the thresholds given as acceptable in recommendation XL of the Plastics Commission of the Federal Health Authority. They also lie considerably beneath the permitted threshold values of Paragraph 175.300 of the US FDA Regulations for synthetic resin coatings. Testing of the migrates showed that the values fixed in recommendation XL of the Plastics Commission had not been reached. In sensory testing, no olfactory or taste fluctuations were apparent. No clouding materials were given off to the test solutions. The coatings according to the invention, in terms of these results, fulfill the requirements set by Paragraph 31, Clause 1 of the German Foodstuffs and Consumer Goods Law.

TABLE 3

Determination of Lead Release From Lead Crystal Goblets Before and After Leaching in Dishwasher

| Treatment Method | Volume Brimfull | Extraction Volume | Lead Release | Lead Release After 1 wash | After 6 or More | 10 | 25 | 50 |
|---|---|---|---|---|---|---|---|---|
| — | 160 ml | 155 ml | 0.24 mg Pb/l | 0.084 mg Pb/l | 0.17 mg Pb/l | 0.24 mg Pb/l | 0.21 mg Pb/l | 0.18 mg Pb/l |
| — | 160 ml | 155 ml | 0.25 mg Pb/l | 0.084 mg Pb/l | 0.16 mg Pb/l | 0.22 mg Pb/l | 0.22 mg Pb/l | 0.16 mg Pb/l |
| Coating of Invention | 162 ml | 157 ml | 0.003 mg Pb/l | 0.003 mg Pb/l | 0.004 mg Pb/l | 0.003 mg Pb/l | 0.005 mg Pb/l | 0.0 mg Pb/l |
| Coating of Invention | 162 ml | 157 ml | 0.002 mg Pb/l | 0.002 mg Pb/l | 0.004 mg Pb/l | 0.003 mg Pb/l | 0.007 mg Pb/l | 0.017 mg Pb/l |

Table 4 shows the measurements relating to foodstuffs law. Coatings applied to foodstuffs consumer products, if in the case of internal coating they come into direct contact with foodstuffs, must be toxicologically harmless. For this reason the coatings according to the invention were tested from the point of view of foodstuffs law. Test conditions were selected taking into account recommendation XL of the Plastics Commission of the Federal Health Council and the supplementary instructions on the testing of plastics (15th, 17th and 46th instruction), and the guidelines of the Council dated Sep. 19, 1985 (85/572/EWG). In addition, the migration in n-heptane was determined in deference to § 175.300 of the US FDA Regulations. Coated glasses were brought b) Testing of Migrates 2 h 70° C.

| Possible Content | Test Media | Proportion |
|---|---|---|
| org. Nitrogen | dist. water | 0.04 mg/100 $cm^2$ |
| | 3% acetic acid | 0.05 mg/100 $cm^2$ |
| | 15% ethanol | 0.05 mg/100 $cm^2$ |
| Phenol | dist. water | undetectable |
| | 3% acetic acid | undetectable |
| Formaldehyde | dist. water | 0.01 mg/100 $cm^2$ |
| | 3% acetic water | 0.02 mg/100 $cm^2$ |
| Prim. aromat. amine | dist. water | undetectable |
| | 3% acetic acid | undetectable |

-continued

| Possible Content | Test Media | Proportion |
|---|---|---|
| Lead, copper, cadmium | dist. water | undetectable |
| | 3% acetic acid | undetectable |
| Zinc | dist. water | undetectable |
| | 3% acetic acid | undetectable | c) Sensory Testing (1 cm$^2$:2 ml; 2 cm$^2$:1 ml)

| Test Medium | Test Conditions | Appearance | Smell | Taste |
|---|---|---|---|---|
| Tap water | 2 h 70° C. | 0/0 | 0/0 | 0/0 |
| | 10 d 40° C. | 0/0 | 0/0 | 0/0 |
| Mineral water | 10 d 40° C. | 0/0 | 0/0 | 0/0 |

0= no noticeable fluctuation

What is claimed is:

1. Method of reducing the lead release in lead crystal glass by application of a coating produced by application and hardening of a coating material containing a hydrolytic condensation product comprising a cross-linkable organo-functional hydrosilicon, a metal compound and an organic prepolymer cross-linkable with this hydrolytic condensate.

2. Method according to claim 1 wherein the coating is produced by at least one of spraying, dipping and centrifuging.

3. Method according to claim 2 wherein hardening is carried out in a temperature range between 100 and 250C.

4. Method according to claim 3 wherein a thickness of the coating in a range between 1 and 50 μm is obtained.

5. Method according to claim 2 wherein a thickness of the coating in a range between 1 and 50 μm is obtained.

6. Method according to claim 1 wherein hardening is carried out in a temperature range between 100 and 250C.

7. Method according to claim 6 wherein a thickness of the coating in a range between 1 and 50 μm is obtained.

8. Method according to claim 1 wherein a thickness of the coating in a range between 1 and 50 μm is obtained.

* * * * *